R. C. HILTON.
AIR PUMP.
APPLICATION FILED NOV. 2, 1914.
1,139,419. Patented May 11, 1915.
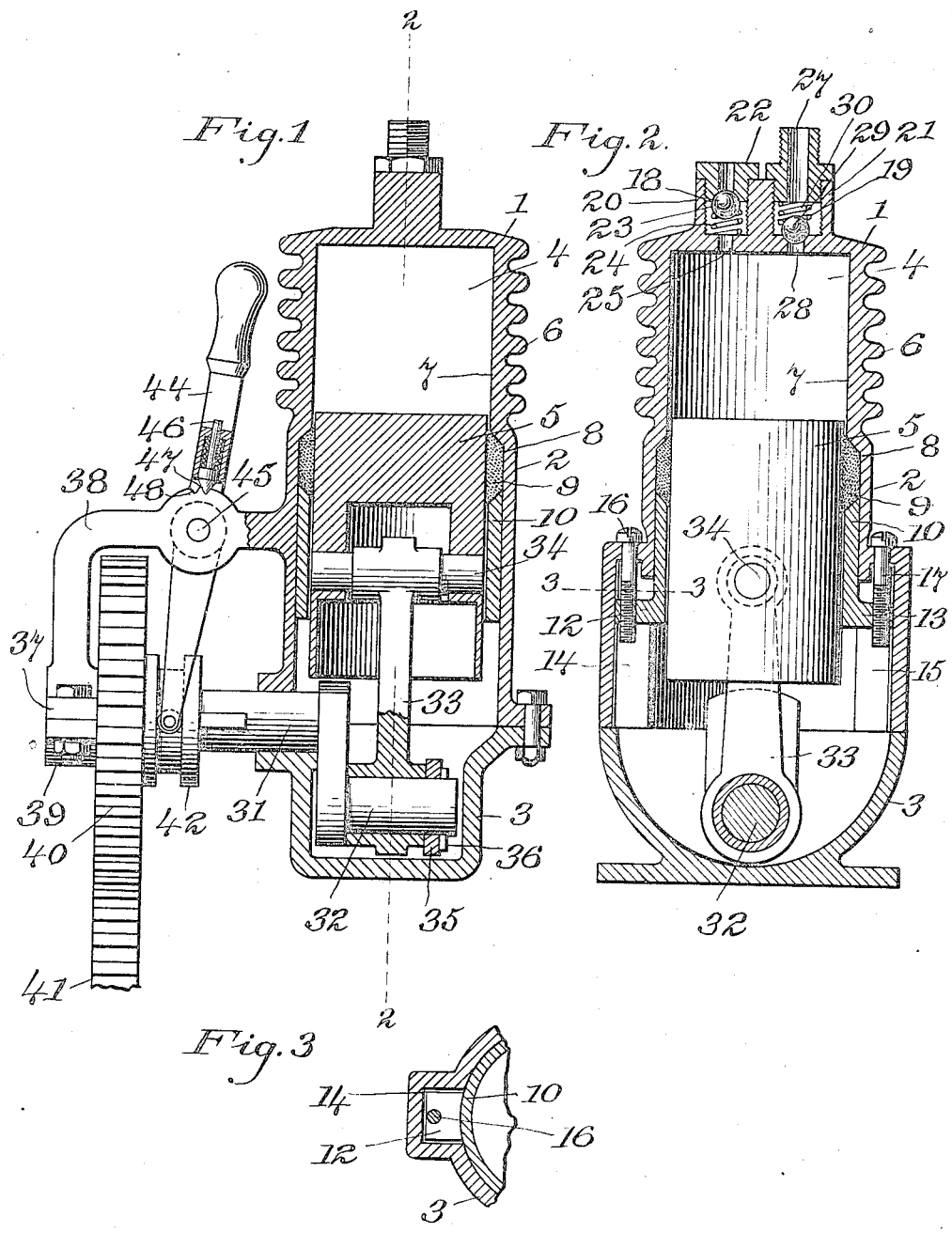

UNITED STATES PATENT OFFICE.

ROLAND C. HILTON, OF BOSTON, MASSACHUSETTS, ASSIGNOR TO LOUIS S. ROTHENBERG, OF BOSTON, MASSACHUSETTS.

AIR-PUMP.

1,139,419.  Specification of Letters Patent.  Patented May 11, 1915.

Application filed November 2, 1914. Serial No. 869,878.

*To all whom it may concern:*

Be it known that I, ROLAND C. HILTON, a citizen of the United States of America, residing at Boston, county of Suffolk, Commonwealth of Massachusetts, have invented certain new and useful Improvements in Air-Pumps, of which the following is a specification.

Air pumps such as used for pumping air into automobile tires and for similar purposes as usually constructed comprise a piston movable within a cylinder, the joint between the piston and cylinder being made tight by the employment of piston rings fitting in grooves extending circumferentially of the piston. As such pumps must be made of small size to permit of their being attached to a motor under the hood of an automobile, they must run at high speed in order to deliver the amount of compressed air necessary to inflate a tire to a pressure of from 60 to 100 pounds per square inch in a short space of time. The fact that such pumps are preferably directly geared to the motor of the automobile also results in their being usually run at high speeds. Where the pump piston fits tightly in the cylinder and the usual form of spring rings are used for packing, this high speed of reciprocation of metal on metal requires efficient lubrication to prevent destructive wear of the parts and offensive squeaking produced by friction. The presence of oil on the spring rings is also necessary to make the contact between cylinder walls, and rings, and between rings and piston, air tight. On the other hand, the presence of such oil in the cylinder for necessary lubrication is not permissible in pumps for inflating tires for the reason that a portion of the oil passes out with the air to the interior of the tires and rapidly disintegrates them, as oil has a well known destructive action on rubber. My invention solves the problem presented by the above stated conflicting conditions, and overcomes all the difficulties heretofore existing by employing in a vertical cylinder pump a special form of stuffing box for the plunger piston, which does away with the necessity for piston rings, restricting all frictional wear to the compressible non-metallic packing used in said stuffing box, providing a closed crank case for the piston driving crank, which has a semi-circular internal cross section, and in which case just sufficient oil may be retained for lubricating the crank, and its connections, and also the piston, by the familiar splash system, but not permitting any of such oil to get up past the packing into the cylinder. At the same time my invention provides convenient means extending outside of such closed crank case for adjusting the gland of the stuffing box and taking up wear in the packing from time to time without opening said casing. Said adjusting means pass through the crank case at points well above the normal level of the oil in said casing, so that there is no opportunity for leakage of the oil through the opening so provided. Consequently, the pump is easily maintained at the highest working efficiency with an occasional simple adjustment of the gland which can be made while the pump is running, if desired, all unnecessary and destructive friction is avoided and only air free from oil or oil vapor is delivered to the tires.

Referring to the drawings in which I have shown by way of illustration a selected embodiment of my invention, Figure 1 is a central sectional view of an air pump constructed in accordance with my invention; Fig. 2 is a sectional view taken on the line 2—2 of Fig. 1; and Fig. 3 is a sectional detail view taken on the line 3—3 of Fig. 2.

In order to have efficient and economical lubrication of the crank and connecting rod bearings and of the piston, and to exclude dirt, it is important that the parts should be inclosed in a closed crank casing which shall be practically continuous with the pump cylinder when the parts are assembled. A piston is reciprocably mounted in the cylinder and a crank shaft is rotatably mounted in the crank case and connected to the piston to provide reciprocation thereof as the crank shaft rotates. An air-tight and oil-tight joint is provided between the piston and cylinder by means of packing which will effectually prevent oil working by the piston into the cylinder.

In the construction illustrated the casing which is indicated generally at 1, is made in two sections, 2, 3, bolted together and preferably divided on the plane of the crank shaft to permit the removal thereof. The upper end of the casing is formed to provide a cylinder 4, in which a trunk piston 5 is reciprocably mounted. The cylinder is provided externally with cooling rings, as indicated at 6, to increase the radiating surface. The interior 7, of the cylinder 4, is preferably made of a diameter slightly in excess of the external diameter of the piston to avoid friction between the two, and this clearance is shown on Figs. 1 and 2 of the drawings. Beyond this portion the cylinder is recessed, as indicated at 8, to provide a portion of larger diameter to receive a compressible packing 9, and a gland member 10. A similar slight clearance may exist between the piston and the gland member, but this is not so important as these parts are efficiently lubricated by the oil splashing up from the crank case. This lubricating action also extends up to the packing 9, but no oil gets beyond said packing when it is properly adjusted by the right degree of compression of the gland. The piston is preferably of such a length that when in its lowermost position its upper end will still be above the upper edge of the packing and when in its uppermost position its lower edge will be below the packing. The packing 9, is preferably of the type known as self-lubricating packing, such as asbestos packing. I prefer the asbestos packing particularly for the reason that it is not affected by the heat and considerable heat is generated by compressing the air.

The gland member is illustrated as a ring shaped member having lugs 12, and 13, projecting laterally upon opposite sides thereof. The casing is preferably provided with vertical ways 14, 15, in which these lugs slide. Screws 16, 17, extend through the casing and engage these lugs to provide for adjustment of the gland to compress the packing. The casing is preferably so shaped that these screws may extend through the casing parallel to the cylinder to engage the lugs. It will be noted these screws are thus accessible from the outside of the casing for adjustment of the gland, and that the openings provided for these bolts through the casing are far above any normal level of oil maintained in the crank casing, so that there is no opportunity for oil to escape therethrough.

I have indicated inlet and outlet valves at 18, and 19, in the closed end of the cylinder, as seen most clearly in Fig. 2 in section. As a convenient means for providing these valves the projecting lugs 20, 21, are cast integral with the cylinder. The inlet valve comprises a screw plug 22, screwed into lug 20. This plug is centrally bored and provided with a valve seat at its inner end against which a ball valve 23, is pressed by a spring 24. A hole 25, provides communication with the interior of the cylinder. Air is thus permitted to enter but cannot escape through this valve. The outlet valve comprises a centrally bored screw plug 27, screw threaded into the lug 21. This plug is threaded at its outer end to receive any suitable connection. A hole 28, provides communication with the interior of the cylinder, a valve seat being formed at the outer edge of the hole. A ball valve 29, is held on this seat by a spring 30.

Any suitable mechanism may be provided to reciprocate the piston relative to the cylinder. In the construction shown I have illustrated a rotatable crank shaft 31, having a crank pin 32, connected to the piston 5, by a connecting rod 33. The piston is preferably hollow and the connecting rod extends into the interior of the piston and is pivotally connected thereto as by a pin 34. The connecting rod is held on a crank pin by a washer 35, and cotter pin 36, thus providing a simple and cheap construction and one which permits the disassembling of the parts when desired. I prefer to employ a crank shaft having but one bearing in the casing and having another bearing 37, provided in an arm 38, cast integrally with, or secured to the casing. The bearing cap 39, of the bearing 37, may be removed to permit removal of the crank shaft.

I have illustrated a gear 40, splined to the crank shaft between the arm and the crank case and arranged in one position to mesh with and be driven by a gear 41. The gear 40, is provided with a grooved hub 42, which is engaged by the lower end of lever 44, pivoted to the arm as indicated at 45. A spring-pressed pin 46, slidable in the lever engages notches 47, 48, upon a boss on the arm to hold the lever and gear in adjusted positions. The gear 41 may be driven in any suitable way.

While I have illustrated my invention as applied to a single cylinder pump, yet it will be obvious that it is equally applicable to multiple cylinder pumps. The construction herein shown enables the use of an air pump having a sufficient amount of oil in the crank case to keep the parts lubricated without any danger that any oil will be pumped into the tires when the pump is in operation or escape from the crank case through the opening provided for the gland adjusting bolts which openings are above the level of the crank shaft bearing and well above the normal level of the oil in the crank case, even if sufficient oil be placed in said crank casing to reach up to, and continuously lubricate, the crank shaft journal and bearing. Said bolts extending outside the closed crank casing can be adjusted to vary the pressure on the gland and packing to take up wear without opening the crank casing, and while the pump is running, if desired.

Having, therefore, described my invention, I claim:

1. A pump comprising a casing provided with ways and having a cylinder and a crank case, inlet and outlet valves in the head of the cylinder, a piston reciprocally mounted in the cylinder, said cylinder being of uniform bore throughout the greater portion of its length, but being internally recessed for a portion of its length to provide a portion of larger diameter, packing in said portion of larger diameter to provide a substantially air-tight joint between the piston and cylinder walls, a gland member also positioned in said portion of larger diameter, said gland member having lugs movable in the ways in the casing, screws extending through the walls of the casing and engaging the lugs to adjust the gland to compress the packing, and a crank shaft rotatably mounted in the crank case and connected to the piston to cause reciprocation thereof.

2. A high speed air compressor comprising, in combination, a substantially vertically arranged cylinder closed at the upper end but having an open lower end provided with an annular recess, a piston in the cylinder, a ring of compressible packing and a suitable gland located in the annular recess to form a stuffing box for the piston, a closed crank case forming an extension of the lower end of the cylinder, and adapted to serve as a reservoir for lubricating oil, a crank journaled therein, a connecting rod pivoted to crank and to piston, and a plurality of bolts for adjusting the gland located in the upper part of the crank casing above the level of the crank shaft, and extending through openings in the casing to the exterior thereof, said openings being above the normal level of the oil in the crank casing.

ROLAND C. HILTON.

Witnesses:
Louis C. Smith,
Harry L. Rothenberg.